(12) United States Patent
Rofheart et al.

(10) Patent No.: US 12,339,393 B2
(45) Date of Patent: Jun. 24, 2025

(54) APPARATUS FOR AND METHODS OF CONTROLLING RADAR CONTACT

(71) Applicant: Applied Signals Intelligence, Inc., Sterling, VA (US)

(72) Inventors: Martin Rofheart, McLean, VA (US); John William McCorkle, Vienna, VA (US)

(73) Assignee: Applied Signals Intelligence, Inc., Sterling, VA (US)

( * ) Notice: Subject to any disclaimer, the term of this patent is extended or adjusted under 35 U.S.C. 154(b) by 0 days.

(21) Appl. No.: 18/667,319

(22) Filed: May 17, 2024

(65) Prior Publication Data

US 2024/0302493 A1 Sep. 12, 2024

Related U.S. Application Data

(62) Division of application No. 16/896,543, filed on Jun. 9, 2020, now Pat. No. 12,025,733.

(51) Int. Cl.
| | | |
|---|---|---|
| *G01S 7/40* | (2006.01) | |
| *G01S 13/86* | (2006.01) | |
| *G01S 13/933* | (2020.01) | |
| *G05D 1/00* | (2024.01) | |
| *G05D 1/46* | (2024.01) | |

(52) U.S. Cl.
CPC ............ *G01S 7/4021* (2013.01); *G01S 13/86* (2013.01); *G01S 13/933* (2020.01); *G05D 1/0202* (2013.01); *G05D 1/46* (2024.01)

(58) Field of Classification Search
CPC ...... G01S 7/4021; G01S 13/933; G01S 13/86; G05D 1/46; G05D 1/0202
See application file for complete search history.

(56) References Cited

U.S. PATENT DOCUMENTS

| | | | |
|---|---|---|---|
| 2,247,294 | A | 6/1941 | Goble et al. |
| 6,089,503 | A | 7/2000 | Volk |
| 6,545,630 | B1 | 4/2003 | Apa et al. |
| 7,212,147 | B2 | 5/2007 | Messano |
| 9,109,862 | B2 | 8/2015 | Factor et al. |
| 2007/0293150 | A1 | 12/2007 | Ezal et al. |
| 2008/0018525 | A1* | 1/2008 | Svy .......................... G01S 7/024 342/172 |
| 2010/0010793 | A1 | 1/2010 | Herman |

(Continued)

FOREIGN PATENT DOCUMENTS

CN 104598453 A 6/2015

OTHER PUBLICATIONS

Harry Kim, U.S. International Searching Authority, International Search Report and Written Opinion, corresponding PCT Application No. PCT/US2021/035825, mailed Nov. 23, 2021, 17 pages total.

Pierre Kabamba et al., "Optimal Path Planning for Unmanned Combat Aerial Vehicles to Defeat Radar Tracking", Journal of Guidance, Control and Dynamics, vol. 29, No. 2, pp. 279-288, 2006.

(Continued)

*Primary Examiner* — Bernarr E Gregory
*Assistant Examiner* — Hailey R Le
(74) *Attorney, Agent, or Firm* — DiBerardino McGovern IP Group LLC (57) ABSTRACT

Apparatus for and method of using derived information about the direction of propagation of an incoming radar beam to control radar return. The information about the direction of propagation of the incoming radar beam is used to alter aspects of a platform's orientation to control the cross section presented to the radar.

18 Claims, 9 Drawing Sheets

(56) References Cited

U.S. PATENT DOCUMENTS

| | | |
|---|---|---|
| 2010/0052987 A1 | 3/2010 | Weinstein |
| 2011/0160941 A1 | 6/2011 | Garrec et al. |
| 2011/0304507 A1 | 12/2011 | Mujahed et al. |
| 2012/0092208 A1 | 4/2012 | LeMire et al. |
| 2012/0298748 A1 | 11/2012 | Factor et al. |
| 2015/0054689 A1 | 2/2015 | Oakley |
| 2015/0168534 A1 | 6/2015 | Holte |
| 2016/0047885 A1 | 2/2016 | Wang et al. |
| 2016/0088498 A1 | 3/2016 | Sharawi |
| 2018/0011180 A1* | 1/2018 | Warnick ............... H01Q 21/064 |
| 2018/0081021 A1 | 3/2018 | Takahashi et al. |
| 2018/0101782 A1 | 4/2018 | Gohl et al. |
| 2019/0389563 A1 | 12/2019 | Swain |
| 2020/0027358 A1 | 1/2020 | Fine |
| 2020/0235843 A1 | 7/2020 | Zemany et al. |
| 2022/0026180 A1* | 1/2022 | Sharpin ................... F41H 11/02 |

OTHER PUBLICATIONS

F.W. Moore, "Radar cross-section reduction via route planning and intelligent control," IEEE Transactions on Control Systems Technology, vol. 10, No. 5, pp. 696-700, Sep. 2002.

Henize et al., Plan Recognition in Military Simulation: Incorporating Maching Learning with Intelligent Agents, Proceedings of the Sixteenth International Joint Conference on Artificial Intelligence, Workshop on Team Behavior and Plan Recognition, Stockholm, Sweden, pp. 53-63, 1999.

M. Pachter and J. Hebert, "Optimal aircraft trajectories for radar exposure minimization", Proceedings of the 2001 American Control Conference, Cat. No. 01CH37148, pp. 2365-2369, 2001.

R. Alderman, "Military embedded systems. Radar cross section: The measure of stealth", Retrieved Jan. 10, 2023, from https://militaryembedded.com/radar-ew/signal-processing/radar-cross-section-the-measure-of-stealth, 2017.

* cited by examiner

APPARATUS FOR AND METHODS OF CONTROLLING RADAR CONTACT

CROSS-REFERENCE TO RELATED APPLICATIONS

This application is a divisional of U.S. application Ser. No. 16/896,543 filed on Jun. 9, 2020, which is incorporated by reference in its entirety herein.

FIELD

The present disclosure relates to devices and methods for controlling radar contact between a platform such as an aircraft and a radar source.

BACKGROUND

There may be circumstances in which it is desirable to control contact that a platform such as an aircraft (fixed wing, helicopter, multi-rotor-copter), watercraft, or land-based vehicle has with a radar source. The use of "aircraft" or "platform" is intended herein to include all of these platforms and any platform whose radar signature could be controlled in response to the angle-of-arrival (AoA) of a radar signal. The amount of radar contact may be regarded as the radar signature of a platform as seen by a radar system. A platform's "radar signature" includes the reflected energy's amplitude and polarization, and may also include features such as the Doppler shift due to the distance between the radar and the platform changing over time and other Doppler features such as spectral terms caused by the aircraft body rotating relative to the angle-of-arrival (AoA) of the radar beam, or caused by vibrations or rotating propellers or turbines. A platform's "RCS parameters" capture its radar signature as a function of the AoA, frequency, and polarization of an incoming signal. As used herein, the term "radar parameters" includes at least the radar's frequency and may also include items such as polarization, sweep-rate, modulation type (such as pulsed, or chirp) and bandwidth.

Various measures have been employed in the past to reduce a platform's RCS such as shaping and the use of special materials to absorb the radar signal so that less can propagate back to its source. Such measures, however, have limited effectiveness, and cannot be quickly controlled. Various measures have also been employed in the past to enhance the RCS such as adding corner reflectors or repeaters to reflect more of the radar signal so more can propagate back to its source. Such measures are cumbersome as they require additional physical space, complexity, and work only in small sectors. It would be desirable to have real-time adaptable "radar signature management objectives" The use of "radar signature management objectives" as used herein refers to a set of objectives whereby one objective may be to reduce the platform's observability to some radars, another objective may be to increase the platform's observability to other radars, and where the objectives are prioritized and the priority might be based on the radar's "beam parameters" or "radar parameters". "Beam parameters" as used herein refers to one or more parameter such as the radar beam's AoA, frequency, polarization, and potentially other parameters such as magnitude, sweep-rate, and modulation type and bandwidth.

Platforms are sometimes configured with the ability to monitor their orientation and course parameters. "Orientation parameters" as used herein includes one or more parameters such as yaw, pitch and roll as well as their derivatives (e.g. rate of change of an orientation angle). "Course parameters" as used herein includes parameters related to position, including cartesian x, y, z coordinates or geospatial latitude, longitude, and altitude coordinates. "Course" also refers to the platform's track, the time series of its positions and their derivatives including velocity-vector (rate of change in x, y, z) and acceleration. The ability to monitor orientation and course parameters is provided by many different means including compasses, gyros, optical trackers, inertial navigation systems (INS), inertial measurement units (EIU), satellite based systems such as the Global Positioning Systems (GPS) and the Global Navigation Satellite System (GLONASS) or similarly, triangulating on other incoming signals using direction finding or time difference of arrival techniques.

Platforms are also configured with physical control mechanisms. "Physical control mechanisms" as used herein includes one or more rudders, ailerons, flaps, actuators that move thruster orientations, steering wheels and linkages or actuators that reorient the rotation-axis of wheels, actuators that move throttles, actuators that move shiftable gears, actuators that apply brakes, or actuators that directly move or rotate the platform, all of which are used to control the course parameters of the platform.

These platforms are often configured with a steering module configured (1) to have access to and the platform's course parameters and orientation parameters, (2) to access steering, and (3) to control the physical control mechanisms so as to affect the platform's orientation parameters and course parameters based on the combination of steering objectives. "Steering objectives" as used herein includes all or some subset of objectives regarding imposing a set of constraints and desires on how the platform's course parameters should be changed over the course of the flight, for purposes of (a) comfort, (b) safety, and (c) navigation, for example such as to simultaneously or separately (a) have the apparent gravity always toward the bottom of the platform, (b) limit control surface angles to avoid events like such as stalls and skids, and (c) obey a user's input, such as a pilot moving a control stick to tell the steering module to make a turn and how sharp to make it, or the pilot instructing the steering module to guide the platform to a destination or waypoint and later changing the location of the destination or waypoint.

These steering modules have been highly refined to simultaneously meet multiple steering objectives. These steering modules do not, however, have the ability to manage or control a radar signature observed by any particular radar. Moreover, these steering modules do not have the information required to regulate a platform's radar signature presented to a particular radar, such as access to the platform's RCS parameters, or access to the observing radar's beam parameters of an incoming radar signal. ". Neither do these steering modules contemplate the existence of an RCS, nor that an RCS observed by radar could be managed by changing the platform's course parameters during a flight.

It is in this context of the need for the devices and methods disclosed in this application arise.

SUMMARY

The following presents a simplified summary of one or more embodiments in order to provide a basic understanding of the embodiments. This summary is not an extensive overview of all contemplated embodiments and is not intended to identify key or critical elements of all embodiments nor set limits on the scope of any or all embodiments. Its sole purpose is to present some concepts of one or more embodiments in a simplified form as a prelude to the more detailed description that is presented later.

According to one aspect, there is disclosed an apparatus installed on a platform, the apparatus comprising a steering module that is configured not only as described above, but is additionally configured (1) to have access to the platform's orientation parameters, (2) to have access to the platform's RCS parameters, (3) to have access to a detection that one or more radar beams are impinging on the platform, (4) to have access to either the location and radar parameters of the one or more radars relative to the platform, or the beam patterns for the one or more radars, (5) to have access to steering objectives that include the standard comfort, safety, and navigation objectives and also radar signature management objectives, and (6) to control the physical control mechanisms so as to affect the platform's orientation parameters such that the observability of the platform is changed according to the radar signature management objectives, which may have the objective of increasing the platform's observability to some radars, and reducing the platform's observability to other radars according to some priority and/or according to a radars' beam parameters or radar parameters or location.

According to another aspect, there is disclosed an apparatus provided on a platform, the apparatus comprising an error computing module and a steering module; wherein the error computing module is configured (1) to have access to the platform's orientation parameters, (2) to have access to the platform's RCS parameters, (3) to have access to a detection that one or more radar beams are impinging on the platform, (4) to have access to the locations and radar parameters for the one or more radars, or the beam parameters of the one or more radars, and (5) to compute and output an error-vector between (a) the platform's current orientation parameters, and (b) orientation parameters needed to make the AoA of a radar's signal equal to a preferred angle in the RCS parameters that better meets the radar signature management objectives; and wherein the steering module is configured (1) to have access to the platform's orientation parameters, (2) to have access to steering objectives which include reducing the magnitude of the error-vector, and (3) to control the physical control mechanism so as to affect the platform's orientation parameters such that the combination of steering objectives is satisfied and as such, the magnitude of the error-vector is reduced. According to another aspect, in these systems the radar's location and radar parameters may be provided by a direction finding ("DF") system.

According to another aspect, in these systems access to the AoA of a radar's signal, frequency, and/or polarization, or to the radar's location, frequency, and/or polarization, may be provided by a direction finding ("DF") system. The DF system provide this information after tracking the radar over a time duration. More than one DF systems may be used, and the data from the more than one DF systems may be triangulated. The DF system may be located on the platform.

According to another aspect, there is disclosed a system as described above wherein access to the radar's location, frequency, and/or polarization, are provided by a steering module arranged to contain or receive the radar cross section presented to an incoming radar beam as a function of its (AoA), arranged to receive orientation, position, and velocity vector of the platform and to cause platform controls to affect the orientation of the platform based at least in part on the direction the direction output to control a radar cross section presented to the incoming radar beam.

According to another aspect, there is disclosed an apparatus comprising a radar direction finding module adapted to generate a direction output signal indicative of a direction of an origin of an incoming radar beam and a steering module arranged to receive the direction output signal and determine a future orientation based at least in part on the direction of the origin of the incoming radar beam as indicated by the direction output to control a radar cross section presented to the incoming radar beam.

According to another aspect, there is disclosed an aircraft, a radar direction finding module arranged on the aircraft and adapted to generate a direction output signal indicative of a direction of an origin of an incoming radar beam, and a steering module arranged to receive the direction output signal and determine a future orientation based at least in part on the direction of the origin of the incoming radar beam as indicated by the direction output to control a radar cross section presented to the incoming radar beam.

According to another aspect, there is disclosed a method comprising generating a direction output signal indicative of a direction of an origin of an incoming radar beam and altering a future orientation of the aircraft based at least in part on the direction of the origin of the incoming radar beam as indicated by the direction output to control a radar cross section presented to the incoming radar beam.

According to another aspect, there is disclosed a method comprising using a radar direction finding module arranged on an aircraft to generate a direction output signal indicative of a direction of an origin of an incoming radar beam and using a steering module arranged on the aircraft and to receive the direction output signal and adapted to alter a future orientation of the aircraft based at least in part on the direction of the origin of the incoming radar beam as indicated by the direction output to control a radar cross section presented to the incoming radar beam.

According to another aspect, there is disclosed an apparatus comprising a radar direction finding module adapted to generate a direction output signal indicative of a direction of an origin of an incoming radar beam and a steering module arranged to receive the direction output signal and adapted to determine an orientation alteration based at least in part on the direction of the origin of the incoming radar beam as indicated by the direction output to control a radar cross section presented to the incoming radar beam. The steering module may be adapted to determine an orientation alteration by altering at least one of yaw, pitch, and roll. The steering module may be adapted may be adapted to determine an orientation alteration to instantaneously control a radar cross section presented to the origin of the incoming radar beam. The steering module may be adapted to determine an orientation alteration to control a radar cross section presented to the origin of the incoming radar beam while traversing at least a portion of a future course.

According to another aspect, there is disclosed an apparatus comprising an aircraft, a radar direction finding module arranged on the aircraft and adapted to generate a direction output signal indicative of a direction of an origin of an incoming radar beam, and a steering module arranged to receive the direction output signal and adapted to determine an orientation alteration based at least in part on the direction of the origin of the incoming radar beam as indicated by the direction output to control a radar cross section presented to the incoming radar beam. The steering module may be adapted to alter a future orientation of the aircraft by altering at least one of pose, track, and altitude.

The steering module may be adapted to determine an orientation alteration by altering at least one of yaw, pitch, and roll. The steering module may comprise an autopilot. The aircraft may comprise an unmanned aircraft. The steering module may be adapted to determine an orientation alteration by instantaneously controlling a radar cross section of the aircraft presented to the origin of the incoming radar beam. The steering module adapted to determine an orientation alteration by controlling a radar cross section of the aircraft presented to the origin of the incoming radar beam while traversing at least a portion of a future course. The aircraft may be adapted to aerobatic flight.

According to another aspect, there is disclosed a method comprising generating a direction output signal indicative of a direction of an origin of an incoming radar beam and altering a future orientation of the aircraft based at least in part on the direction of the origin of the incoming radar beam as indicated by the direction output to control a radar cross section presented to the incoming radar beam. Altering a future orientation of the aircraft may comprise altering at least one of yaw, pitch, and roll of the aircraft. Altering the future orientation of the aircraft may comprise instantaneously controlling a radar cross section of the aircraft presented to the origin of the incoming radar beam. Altering the future orientation of the aircraft may comprise controlling a radar cross section of the aircraft presented to the origin of the incoming radar beam while traversing at least a portion of a future course. The aircraft may comprise an unmanned aircraft. The aircraft may be adapted to aerobatic flight and the future course of the aircraft may include one or more aerobatic maneuvers.

According to another aspect, there is disclosed a method comprising using a radar direction finding module arranged on an aircraft to generate a direction output signal indicative of a direction of an origin of an incoming radar beam, and using a steering module arranged on the aircraft and to receive the direction output signal and adapted to determine a future orientation of the aircraft based at least in part on the direction of the origin of the incoming radar beam as indicated by the direction output to control a radar cross section presented to the incoming radar beam. The future orientation may comprise altering at least one of yaw, pitch, and roll of the aircraft. Altering the future orientation of the aircraft may comprise instantaneously controlling a radar cross section of the aircraft presented to the origin of the incoming radar beam. Altering the future orientation of the aircraft may comprise controlling a radar cross section of the aircraft presented to the origin of the incoming radar beam while traversing at least a portion of a future course. The method may further comprise displaying the altered future course of the aircraft. The steering module may comprise an autopilot. The aircraft may comprise an unmanned aircraft. The aircraft may be adapted to aerobatic flight and changing the orientation of the aircraft may include one or more aerobatic maneuvers.

According to another aspect, there is disclosed an apparatus comprising a radar detector adapted to detect at least two pulses of an incoming radar beam and to generate a radar detection signal indicative of the detection and of characteristics of the detected pulses; a radar direction finding module arranged to receive the radar detection signal and adapted to generate a direction output signal indicative of a direction of an origin of an incoming radar beam, a radar estimator arranged to receive the radar detection signal and adapted to generate an estimator output signal indicative of the pulse characteristics, and a steering module arranged to receive the direction output signal and the estimator output signal and adapted to determine an orientation alteration based at least in part on the direction of the origin of the incoming radar beam as indicated by the direction output and the estimator output signal to control a radar cross section presented to the incoming radar beam. The characteristics may include pulse signal strength, timing of the pulses, and gaps in receiving the pulses. The steering module may comprise a memory storing information of the RCS versus azimuth for a platform carrying the apparatus. The steering module may comprise a memory adapted to store information on constraints in altering an orientation or course of a platform carrying the apparatus and wherein the steering module determines an orientation alteration based at least in part on the constraints. The constraints may include at least one of travel time between two way-points, arrival time at a point, and fuel remaining at a waypoint. The apparatus may further comprise a user interface arranged to enable a user to provide user control signals and wherein the steering module may be arranged to receive the user control signals and determines an orientation alteration based at least in part on the user control signals. The user control signals may include at least one of decrease radar cross section, increase radar cross section, and adjust orientation without regard to radar cross section. The apparatus may comprise user input arranged to enable a user to provide user control signals and wherein the steering module may be arranged to receive the user control signals and determines an orientation alteration based at least in part on the user control signals and the constraints. The user control signals include at least one of decrease radar cross section, increase radar cross section, and determine orientation without regard to radar cross section. The user control signals may include data on an amount of weighting the steering module assigns to each of the constraints in determining an orientation alteration. The radar detector and the radar direction finding module may be arranged on a first platform and the steering module may be arranged on a second platform and the first platform may comprise a transmitter arranged to send information from the first platform to the second platform.

According to another aspect, there is disclosed an apparatus for regulating a radar signature of a platform, the apparatus comprising a steering module arranged to have access to data including: the platform's orientation parameters; the platform's RCS parameters; one of (a) a location and radar parameters of at least one radar relative to the platform and (b) beam parameters for at least one radar; and steering objectives that include safety and navigation objectives and also radar signature management objectives, and adapted to control at least one physical control mechanism so as to affect the platform's orientation parameters such that the observability of the platform may be changed according to the radar signature management objectives.

According to another aspect, there is disclosed an apparatus for regulating a radar signature of a platform, the apparatus being located on the platform, the apparatus comprising an error computing module arranged to have access to: the platform's orientation parameters; the platform's RCS parameters; one of (a) a location and radar parameters for at least one radar beam and (b) at least one beam parameter of at least one radar beam, and adapted to compute and output an error-vector between (a) the platform's current orientation parameters, and (b) orientation parameters needed to make an AoA of a radar's signal equal to an angle in the RCS parameters that better meets the radar signature management objectives and a steering module arranged to have access to the platform's orientation parameters and steering objectives which include reducing the magnitude of the error-vector, and adapted to control the physical control mechanism so as to affect the platform's orientation parameters such that the combination of steering objectives may be satisfied and as such, the magnitude of the error-vector may be reduced. The apparatus may further comprise a direction finding system and wherein the one of (a) the location and radar parameters for at least one radar beam and (b) at least one beam parameter of at least one radar beam, are provided by the DF system. The apparatus may further comprise a direction finding system adapted to provide information in the form of one of (a) the radar signal's AoA, frequency, or polarization, and (b) the radar's location, frequency, or polarization, to the error computing module. The direction finding systems may be adapted to perform tracking of the at least one radar beam over a time duration and to provide the information at least partially on the basis of the tracking. The apparatus may comprise at least two additional direction finding systems located on other platforms and wherein the error computing module triangulates the data from the at least three direction finding systems to determine the radar location relative to the platform. A access to the at least one radar beams location, frequency, or polarization may be provided by the steering module, the steering module being arranged to contain or receive the radar cross section presented to an incoming radar beam as a function of its AoA, arranged to receive orientation, position, and velocity vector of the platform and to cause platform controls to affect the orientation of the platform based at least in part on the direction the direction output to control a radar cross section presented to the incoming at least one radar beam.

Further embodiments, features, and advantages of the present invention, as well as the structure and operation of the various embodiments are described in detail below with reference to accompanying drawings.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art based on the teachings contained herein.

DETAILED DESCRIPTION

Various embodiments are now described with reference to the drawings, wherein like reference numerals are used to refer to like elements throughout. In the following description, for purposes of explanation, numerous specific details are set forth in order to promote a thorough understanding of one or more embodiments. It may be evident in some or all instances, however, that any embodiment described below can be practiced without adopting the specific design details described below. In other instances, well-known structures and devices are shown in block diagram form in order to facilitate description of one or more embodiments.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include solid state memory, read only memory (ROM), random access memory (RAM), magnetic disk storage media, optical storage media, flash memory devices; electrical, optical, acoustical or other forms of propagated signals (e.g., carrier waves, infrared signals, digital signals, etc.), and others. Further, firmware, software, routines, and instructions may be described herein as performing certain actions. However, it should be appreciated that such descriptions are merely for convenience and that such actions in fact result from computing devices, processors, controllers, or other devices executing the firmware, software, routines, instructions, etc.

Figure 1:
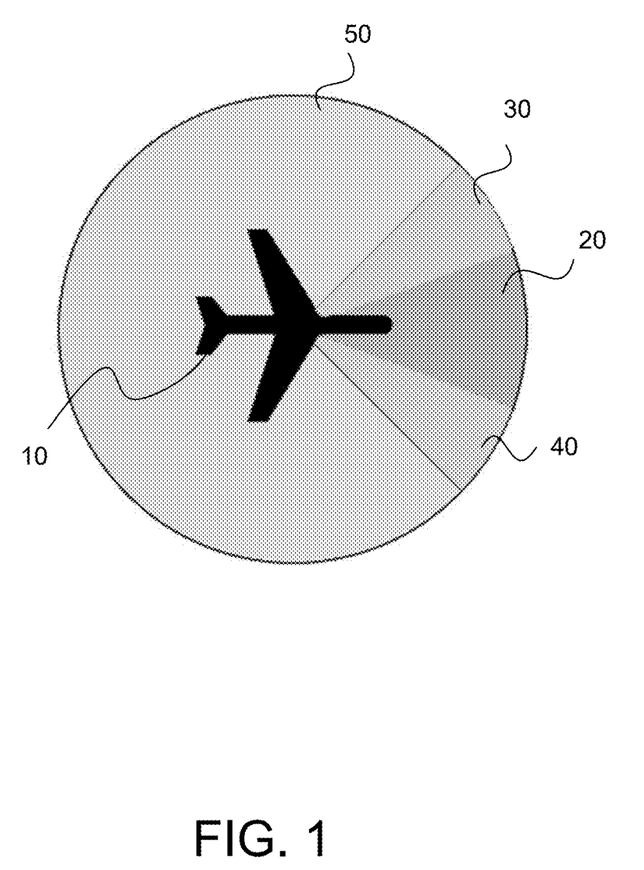
FIG. 1 is a diagram showing an example of aircraft visibility as a function of azimuth.
Figure 2:
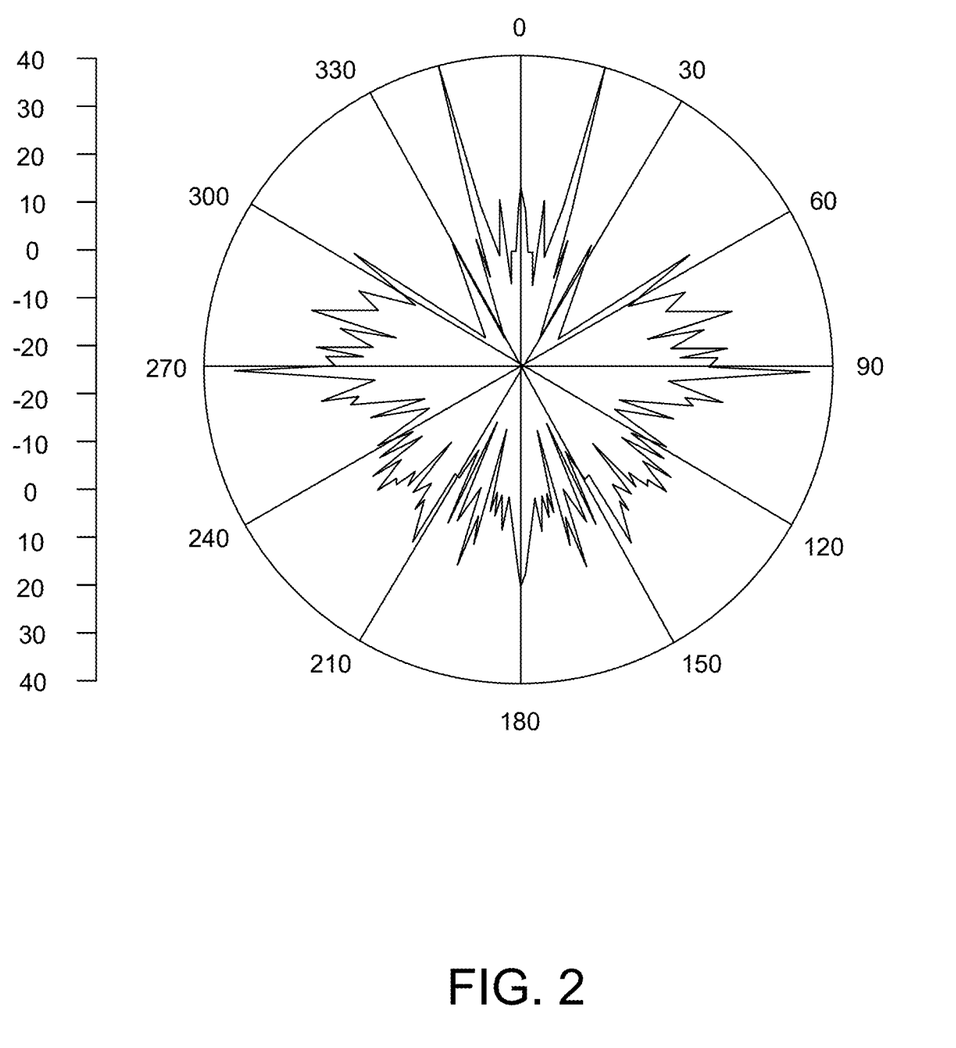
FIG. 2 is a diagram showing an example of radar cross section as a function of azimuth.

With initial reference to FIG. 1 there is shown as an example of a platform an aircraft 10 in flight. Generally speaking, the aircraft 10 will have varying amounts of visibility to a radar beam impinging on the aircraft in the plane of the figure depending on the azimuthal angle. For example, the amount of visibility may be at a minimum directly ahead of the aircraft 10 as indicated by the sector 20. The visibility may generally increase as a function of angular deviance from the direction of travel as indicated by sectors 30 and 40 and may further increase as indicated by sector 50. These principles are further illustrated in FIG. 2. The amplitude of the return signal expressed in terms of the radar cross section, a, in dB square meters ($dBm^2$) may vary as a function of azimuth as shown.

RF emitters include conventional radar, e.g. active and monostatic (meaning emitter and receiver are co-located) and passive radar that uses emitters of opportunity (e.g. broadcast AM, FM and TV) to with a passive radar receiver (bistatic) to detect and track aircraft. The terms radar, RF radar, and RF emitter are intended to encompass all such systems.

Various systems and methods for determining the direction of an incoming radar beam are known in the art. For example, U.S. Pat. No. 9,880,260 to McCorkle, titled "Electrically Small, Range And Angle-of-Arrival RF Sensor and Estimation System" issued Jan. 30, 2018 (McCorkle '260) and assigned to the assignee of the present application, the entire specification of which is hereby incorporated by reference, discloses an RF emitter sensing device having an antenna circuit and an estimator configured to output, for one or more incoming signals-of-interest (SoI), either or both of an estimated range to the emitter of each SoI, and estimates for one or more angles corresponding to the 3D angle-of-arrival (AoA) for each SoI. This is one such system for direction finding, one of ordinary skill in the art will be familiar with other suitable direction-finding systems as well.

A platform such as an aircraft provided with the ability to detect the direction of an incoming radar beam may use this information to alter its orientation so as to control the radar cross section which the platform is presenting to the beam. This control may be immediate, that is, the aircraft can make an immediate change in orientation to alter its radar cross section. Alternatively, or in addition, the aircraft may alter all or portions of its longer term orientation over the course of its travel so as to control its radar cross section as much as possible while also satisfying other constraints on its ability to alter its orientation, such as transit time. In other words, the aircraft's ability to alter its orientation to reduce its radar cross section may be constrained by other variables such as desired arrival time, amount of fuel, and so on. In general, a system may be devised which takes all of these parameters into account and supplies the best overall orientation. Optimization of multiple objectives is commonly done, including items such as navigation, passenger comfort, and G-force limits.

For some applications, it may be beneficial that the aircraft be provided with the optimizations to perform aerobatic maneuvers such as skids, slips etc. so that it may alter orientation quickly. The principles described here may be used to assist pilot control of existing aircraft. The principles described herein may be used with flight controls for more instantaneous response to radar angle of arrival.

The following discussion is in terms of an aircraft. This broadly encompasses all forms of aircraft including unmanned aircraft. It will be apparent, however, that the principles may be applied to other platforms.

As used herein, the direction of a radar beam means the direction of propagation of the beam from its source to the platform. It should be noted that in addition to presenting a controlled, e.g., minimum cross section, it may also be useful to limit detection by Doppler radar by traveling along a course which is as orthogonal to the beam as possible in view of other constraints.

The term "heading" (yaw) is used herein in its conventional sense as describing the direction a platform is pointing. The term "course" or "course angle" refers to the direction a platform is actually moving. The terms "orientation" or "pose" (roll, pitch and yaw) are used interchangeably to describe an orientation with respect to an incoming radar beam. Thus, there are multiple orientations that deliver the same course.

RCS defines the magnitude of the radar return as a function of frequency, azimuth, elevation and polarization. According to an aspect of an embodiment, radar returns are controlled by varying the platform orientation with respect to the radar beam. One example is altering the aircraft's orientation to present an RCS null to the radar for the frequency and polarization the radar has been determined to be using.

Doppler is indicative of the rate a platform is moving toward or away from the radar. It is used to separate fast moving targets from clutter (e.g. radar returns from trees, buildings, terrain) that are slow moving. The Doppler return can be controlled by altering course. One example is turning course perpendicular to the radar beam, which would result in zero Doppler. The aircraft would end up circling the radar.

If the aircraft were low to the ground, and there was a lot of clutter, the aircraft would effectively "disappear to the clutter."

For fixed wing aircraft, the x-axis is taken as positive from the tail to through the nose of the aircraft. The aircraft nose can rotate up and down about the y-axis, a motion known as pitch. Pitch control is typically accomplished using an elevator on the horizontal tail. Second, the wingtips can rotate up and down about the x-axis, a motion known as roll. Roll control is usually provided using ailerons located at each wingtip. Finally, the nose can rotate left and right about the z-axis, a motion known as yaw. Yaw control is most often accomplished using a rudder located on the vertical tail. These can change the angle to the radar without (necessarily) impacting direction of flight. In the description that follows, the signals generated in response to a radar contact are used to influence the positions of these control surfaces.

Some of the discussion which follows is in terms of various modules or systems for performing certain functions. Although shown in the figures and described as co-located, it will be understood by one of ordinary skill in the art that these modules maybe may be distributed between or among multiple platforms as explained in more detail below.

Figure 3:
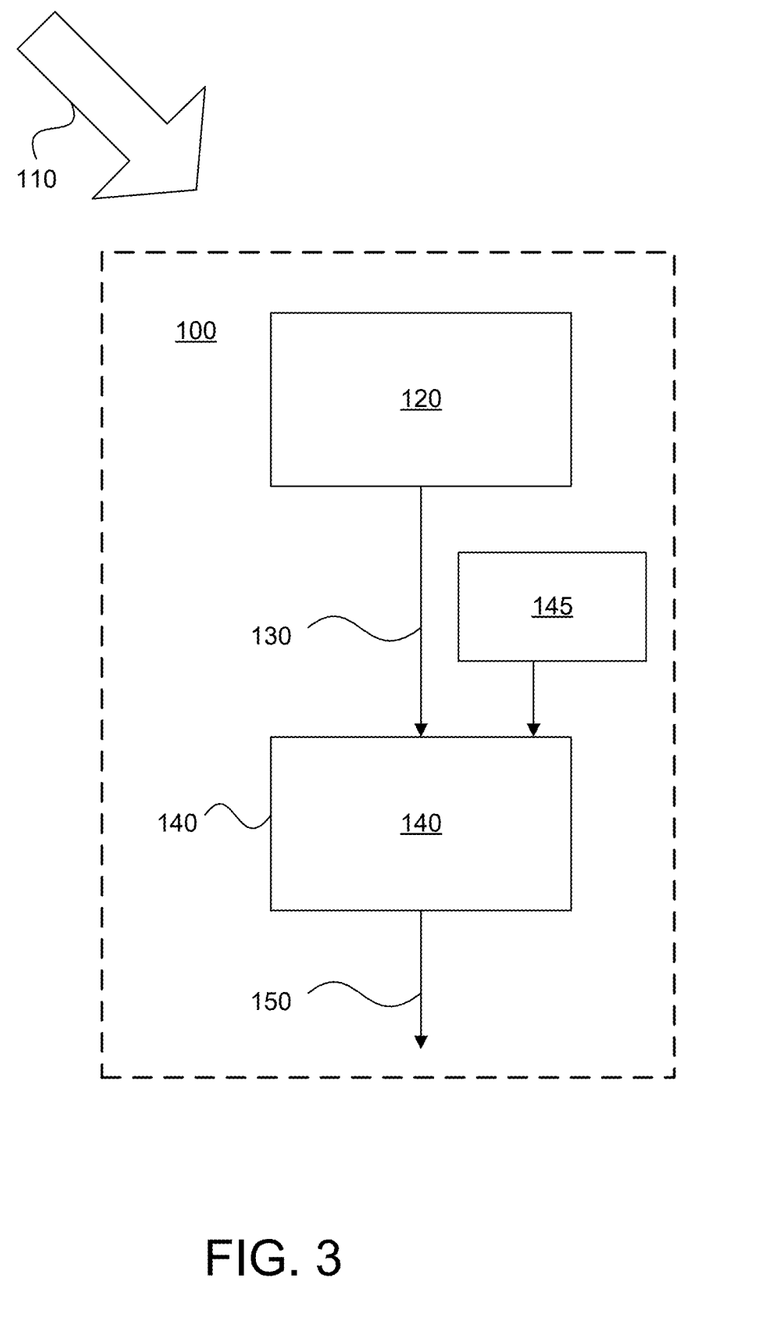
FIG. 3 is a functional block diagram of a system according to an aspect of an embodiment of the present invention.

Turning now to FIG. 3, there is depicted a functional block diagram of a direction-finding based radar signature management system 100 according to one aspect of an embodiment. A radar beam 110 propagates as shown by the open arrow. A direction finding module 120 detects the incoming radar beam 110 and determines the direction from which the radar beam 110 is coming. Direction finding module 120 produces a signal 130 which is indicative of the direction of the incoming radar beam 110. Additionally, it can produce signals indicative of the radar beam's frequency, polarization and waveform and time pulse repetition characteristics. Signal 130 is presented to a steering module 140. The steering module 140 produces a signal 150 which indicates an alteration to an existing orientation or course to manage (e.g., reduce or enhance) the radar signature of the aircraft.

For some applications it is advantageous to provide the steering module with the ability to manage multiple constraints in determining a change in orientation or course. In other words, in general there may be circumstances in which simply adopting an orientation that minimizes RCS would be impractical due to other constraints such as travel time between two way-points, or arrival time at a point, or on fuel remaining at a way-point. In such circumstances, in some embodiments the steering module is able to determine the optimal change in orientation that can be effected without unduly compromising the ability to satisfy these other constraints. Conversely there may be circumstances in which it is known that the platform is subject to only low detectability. In such circumstances satisfying the other constraints can have a higher weight or priority. It may even be desired to maximize RCS in low detectability conditions. In the embodiment of FIG. 3 an interface 145 provides an ability to control the steering module 140 to cause it, for example, to operate in a mode in which it seeks to minimize the radar signature, or operate in a mode in which it seeks to maximize the radar signature, or disengage control of radar signature entirely, that is, operate without regard to effect on radar signature. Through the interface weighting can be assigned to the other objectives or constraints such as those described above.

Figure 4:
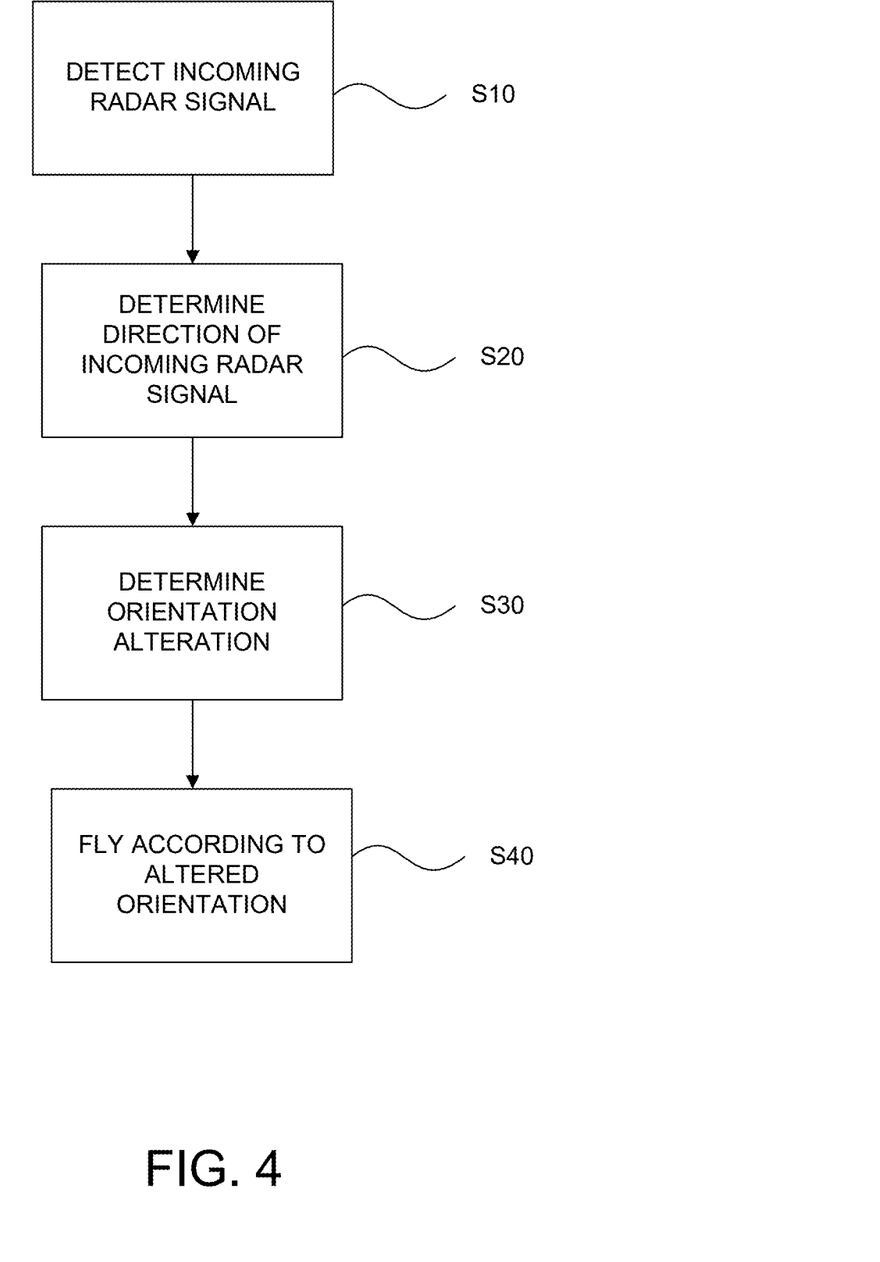
FIG. 4 is a flowchart showing a method according to an aspect of an embodiment of the present invention.

FIG. 4 is a functional block diagram of a method to be implemented according to another aspect of an embodiment.

In a step S10 the incoming radar signal is detected. In a step S20 the direction of the incoming radar signal is determined. Frequency, polarization, waveform and pulse repetition timing (intervals may be at variable times, so not necessarily a rate or frequency) may be determined as well. In a step S30 an orientation alteration is determined based at least in part on the direction determination made in step S20. In step S40 the aircraft is caused to fly according to the orientation as altered by the orientation alteration determination made in step S30.

Figure 5:
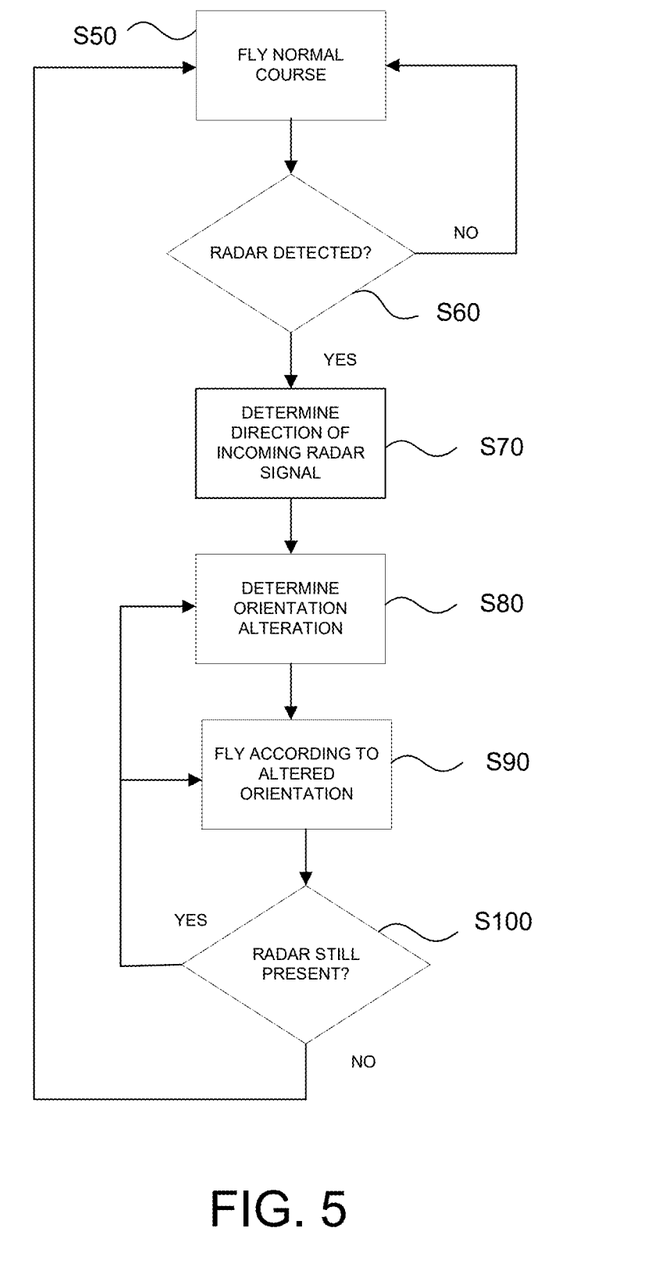
FIG. 5 is a flowchart showing a method according to another aspect of an embodiment of the present invention.

FIG. 5 is a functional block diagram of a method to be implemented according to another aspect of an embodiment. In a step S50 the aircraft flies according to its existing orientation. In step S60 a determination is made of whether radar has been detected. If no radar has been detected in step S60, then the aircraft continues to fly its normal orientation. If radar is detected, however, then in step S70 a determination is made of the direction of the incoming radar signal. Then, in a step S80, a determination is made of what orientation alteration should be imposed. In step S90 the aircraft is made to fly according to the altered orientation. In step S100 a determination is made whether the radar is still present. If the radiator is no longer present, then the process reverts to step S50 and the aircraft reverts to flying its originally intended orientation, that is, without further maneuvers to avoid radar. If the radar is still present, then the process may revert to step S80 and a new orientation alteration may be determined. Alternatively, the process can revert to step S90 where the aircraft continues to fly according to the previous orientation alteration.

Figure 6:
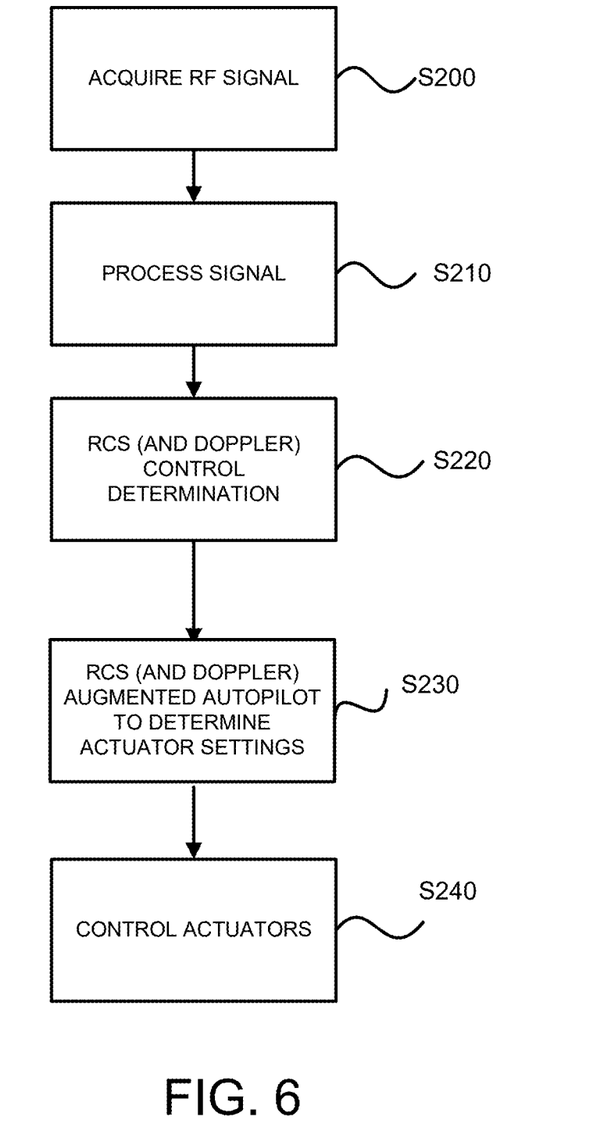
FIG. 6 is a flowchart showing a method according to another aspect of an embodiment of the present invention.

FIG. 6 is a flowchart describing a method according to another aspect of an embodiment. In FIG. 6, is a step S200 the RF radar signal is acquired. This can be accomplished, for example, using an antenna of the type described in McCorkle '260 incorporated above. It will be apparent, however, that other antennas and devices for acquiring the signal may be used. In step S210 parameters of the acquired signal such as its angles of arrival, frequency, and polarization are determined. In step S220 the orientation to control the RCS presented to the radar signal origin is determined. Also, at the same time, if it is desired to control the Doppler signal returned by the aircraft then the course to control the Doppler return signal is also determined. In step S230 it is determined how to set the aircraft actuators to achieve the orientation (and course if desired) determined in step S220. In step 240 the control surfaces are adjusted as determined in step S230. For aircraft other than fixed wing aircraft such as multi-rotor-copters and helicopters the orientation and course can be adjusted in a known manner.

Figure 7:
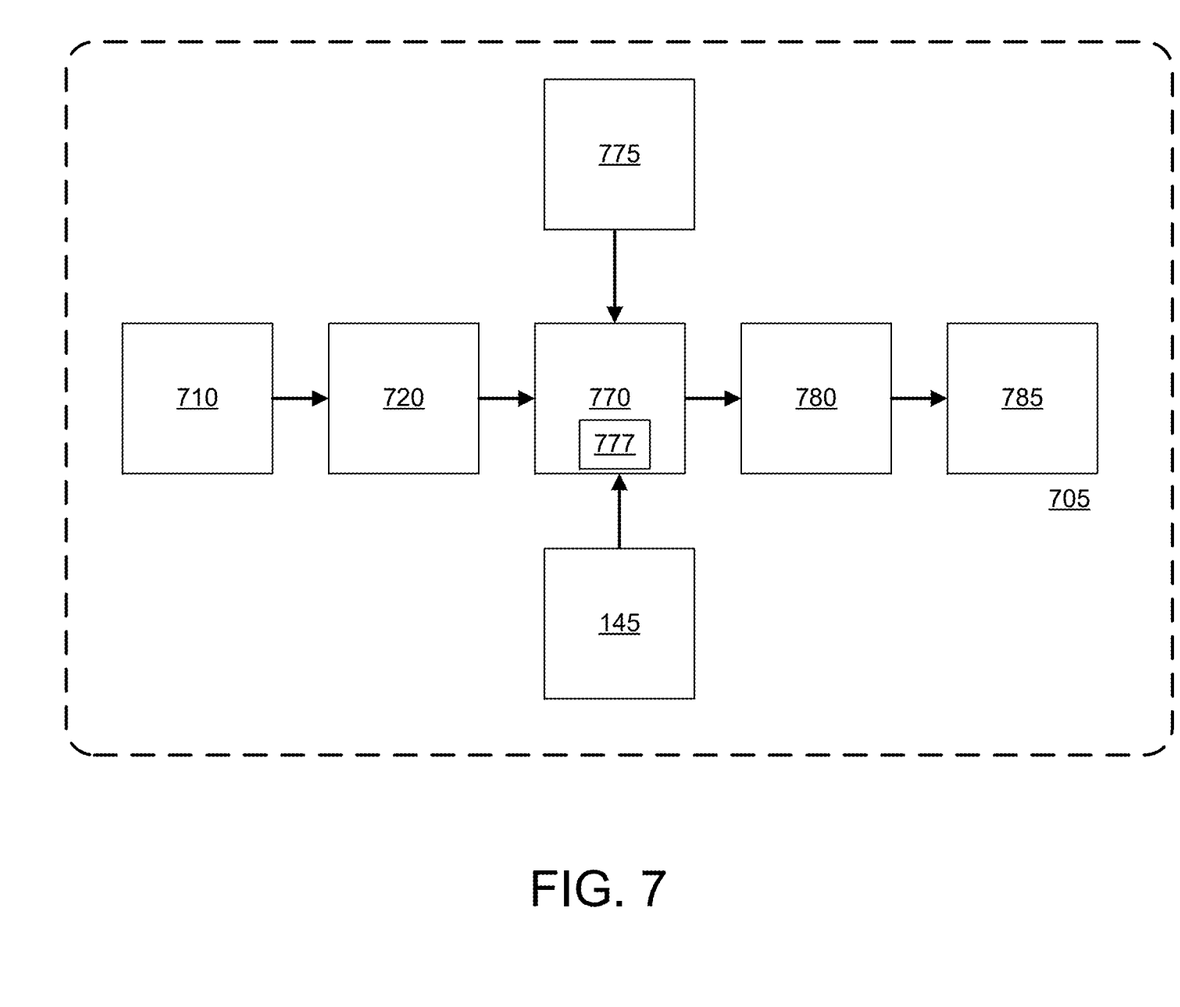
FIG. 7 is a diagrammatic representation of distribution of functionality according to another aspect of an embodiment of the present invention.

Hardware and software systems to provide the functionality described above can all be located on a single platform such as an aircraft. FIG. 7 graphically depicts an arrangement in which a platform 705, which may, for example, be an aircraft, is provided with a radar acquisition module 710 which acquires the RF radar signal. As noted, this radar acquisition module 710 may be implemented as described in McCorkle '260 or maybe some other suitable system. The radar acquisition module 710 provides information about the acquired signal to a detection, classification, and direction finding module 720. Detection, classification, and direction finding module 720 then generates a signal conveying the direction finding data, the angle of arrival of the RF radar signal, and the frequency of the RF radar signal to an RCS and Doppler control module 770 which determines what changes to orientation and course settings are desired and supplies those signals to an RCS and Doppler augmented autopilot module 780 which generates the control signals for the control surfaces of an aircraft. For some applications, it may also be advantageous if RCS and Doppler control module 770 also takes into account geographic information such as the position of platform 700 and terrain between radar and aircraft. The system shown in FIG. 7 may also include an interface 145 as described above.

The systems and methods disclosed herein for some applications advantageously employ a radar estimator 775. In general terms, some radars are mechanically rotated, and some are not. Phased array versions can blink and randomize pulse times. Mechanically rotated radar can leave a gap of several seconds between the times when several pulses hit the aircraft. A radar-state estimator, or simply radar estimator, is a system that examines the pulse detections, their signal strength, and the timing and gaps in receiving them. It may be a separate component as shown or may be incorporated into another component such as the RCS and Doppler control module 770 which can use this information to tell the steering module algorithms when to coast, and when the aircraft could turn through high RCS angles and get to another low RCS angle before the radar beam comes back to paint the aircraft again.

For some applications and implementations, it may be advantageous to store and use data pertaining to the aircraft RCS in a memory 777 which may be part of the RCS and Doppler control module 770 as shown or located elsewhere. Aircraft RCS is generally a multidimensional function of factors such as frequency of the RF radar signal, aircraft azimuthal angle and elevation angle with respect to the radar beam, and polarization of the radar beam. A matrix of RCS azimuth and elevation values for each frequency and polarization (e.g. vertical, horizontal, circular . . . ) can be stored. Alternatively, RCS azimuth and elevation values can be computed by functions (e.g. curve fitting) or a combination of stored and computed, as in an interpolator.

Figure 8A:
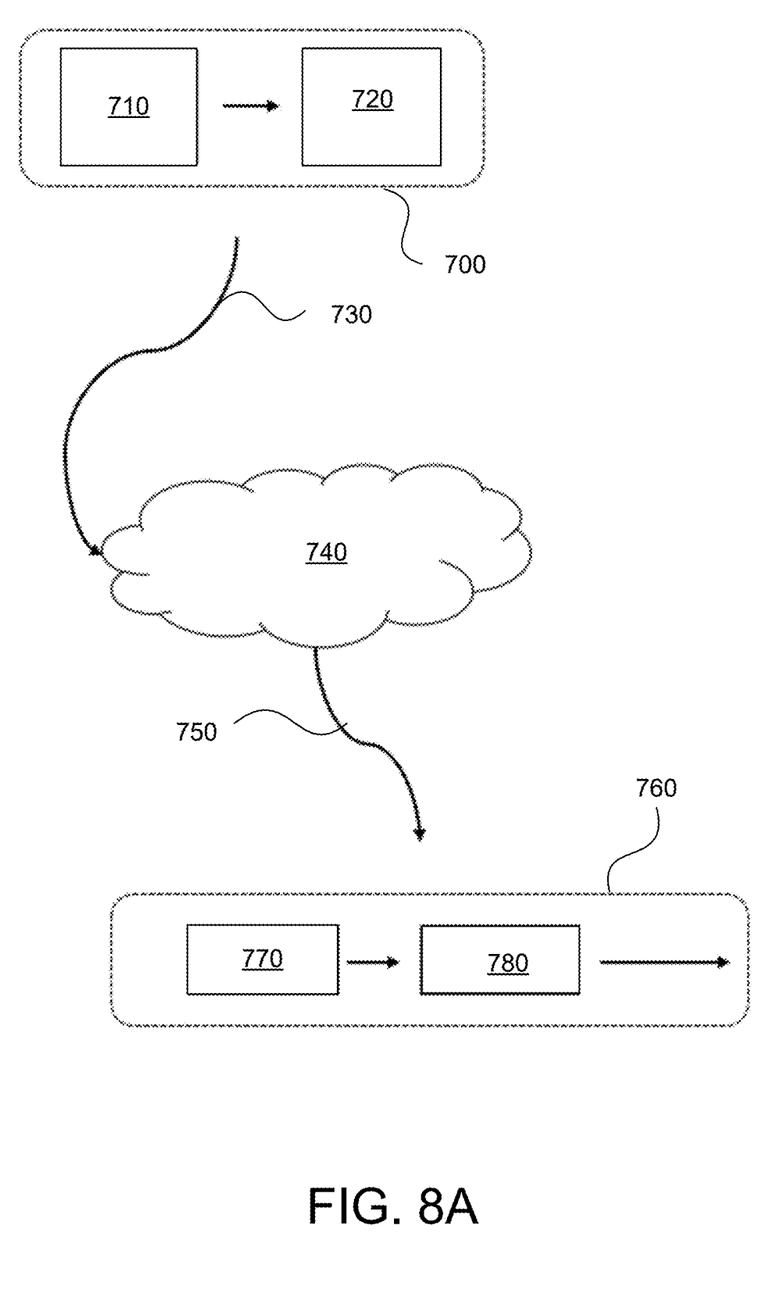
FIG. 8A is a diagrammatic representation of distribution of functionality according to another aspect of an embodiment of the present invention.

Alternatively, these systems may be distributed among multiple platforms. FIG. 8A graphically depicts an arrangement in which a first platform 700, which may, for example, be an aircraft, is provided with the components necessary to provide the front-end functionality of acquiring the RF signal and detecting, classifying, and determining a direction of that signal. More specifically, a radar acquisition module 710 acquires the signal. As noted, this radar acquisition module 710 may be implemented as described in McCorkle '260 or maybe some other suitable system. The radar acquisition module 710 provides information about the acquired signal to a detection, classification, and direction finding module 720. Detection, classification, and direction finding module 720 then generates a signal 730 carrying the direction finding data, the angle of arrival of the RF radar signal, and the frequency of the RF radar signal. For some applications, it may also be advantageous if platform 700 also provides geographic information such as the position of platform 700 and may include a radar estimator as described above. This information is conveyed as the signal 730 to an information distribution system depicted as cloud 740, which may be a direct radio link, or may be a link through a system of servers, or any other system that can relay the information from platform 700 as a signal 750. The signal 750 is received by a second platform 760 which may, for example, be a second aircraft. Platform 760 includes an RCS and Doppler control module 770 which determines what changes to orientation and course settings are desired and supplies those signals to an RCS and Doppler augmented autopilot module 780 which generates the control signals for the control surfaces of an aircraft.

Figure 8B:
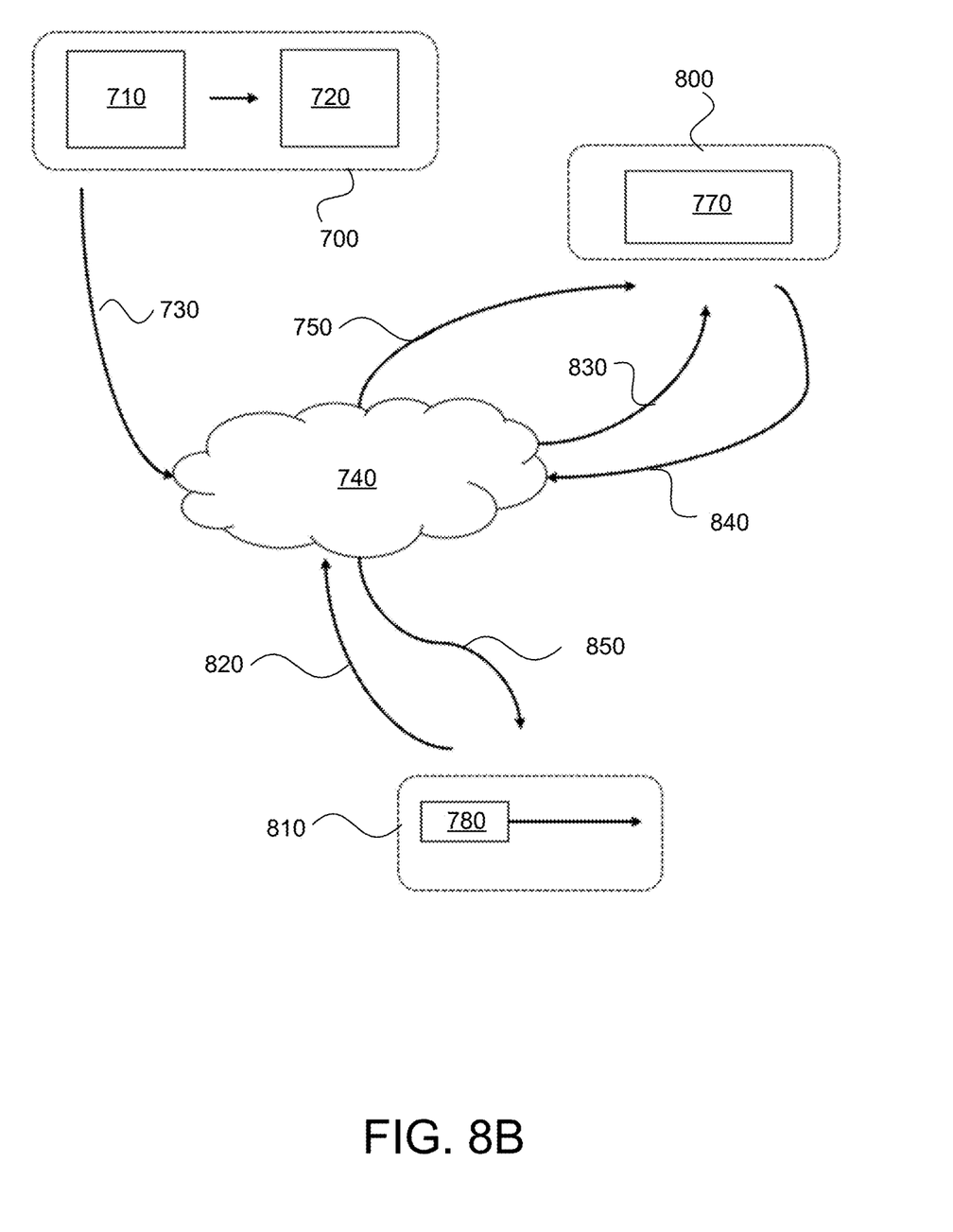
FIG. 8B is a diagrammatic representation of distribution of functionality according to another aspect of an embodiment of the present invention.

FIG. 8B also graphically depicts an arrangement in which a first platform 700, which may, for example, be an aircraft, is provided with the components necessary to provide the front-end functionality of acquiring the RF signal and detecting, classifying, and determining a direction of that signal. More specifically, a radar acquisition module 710 acquires the RF radar signal. As noted, this radar acquisition module 710 may be implemented as described in McCorkle '260 or maybe some other suitable system. The radar acquisition module 710 provides information about the acquired signal to a detection, classification, and direction finding module 720. Detection, classification, and direction finding module 720 then generates a signal 730 carrying the direction finding data, the angle of arrival of the RF radar signal, and the frequency of the RF radar signal. For some applications, it may also be advantageous if platform 700 also provides geographic information such as the position of platform 700 and may include a radar estimator as described above. This information is conveyed as the signal 730 to an information distribution system depicted as cloud 740, which may be a direct radio link, or may be a link through a system of servers, or any other system that can relay the information from platform 700 as a signal 750. The signal 750 is received by a second platform 800 which may, for example, be a second aircraft or ground based. Platform 810 which in the example is an aircraft sends to the cloud 740 a signal 820, received by platform 800 as signal 820 which conveys information on the present orientation state N and present course state N of the platform 810. Platform 800 includes an RCS and Doppler control module 770 which determines based on the information conveyed in signal 740 and 830 what changes to orientation and course settings are desired and supplies those signals as signals 840, 850 as new orientation N+1 and new course N+1 through cloud 740 as a signal 850 to an RCS and Doppler augmented autopilot module 780 on platform 810 which generates the control signals for the control surfaces of platform 810.

The above description includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is construed when employed as a transitional word in a claim. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. Apparatus comprising:
   a radar detector adapted to detect at least two pulses of an incoming radar beam and to generate a radar detection signal indicative of the detection and of characteristics of the detected pulses;
   a radar direction finding module arranged to receive the radar detection signal and adapted to generate a direction output signal indicative of a direction of an origin of the incoming radar beam;
   a radar estimator arranged to receive the radar detection signal and adapted to generate an estimator output signal indicative of the characteristics of the detected pulses; and
   a steering module arranged to receive the direction output signal and the estimator output signal and adapted to determine an orientation alteration based at least in part on the direction of the origin of the incoming radar beam as indicated by the direction output and the estimator output signal to control a radar cross section presented to the incoming radar beam.

2. Apparatus as claimed in claim 1 wherein the characteristics of the detected pulses include pulse signal strength, timing of the pulses, and gaps in receiving the pulses.

3. Apparatus as claimed in claim 1 wherein the steering module comprises a memory adapted to store information of the radar cross section versus azimuth for a platform carrying the apparatus.

4. Apparatus as claimed in claim 1 wherein the steering module comprises a memory adapted to store information on constraints in altering an orientation or course of a platform carrying the apparatus and wherein the steering module determines an orientation alteration based at least in part on the constraints.

5. Apparatus as claimed in claim 4 wherein the constraints include at least one of travel time between two way-points, arrival time at a point, and fuel remaining at a way-point.

6. Apparatus as claimed in claim 4 further comprising a user interface adapted to enable a user to provide user control signals and wherein the steering module is arranged to receive the user control signals and is adapted to determine an orientation alteration based at least in part on the user control signals and the constraints.

7. Apparatus as claimed in claim 6 wherein the user control signals include at least one of decrease radar cross section, increase radar cross section, and determine orientation without regard to radar cross section.

8. Apparatus as claimed in claim 7 wherein the user control signals include data on an amount of weighting the steering module assigns to each of the constraints in determining an orientation alteration.

9. Apparatus as claimed in claim 4 wherein the radar detector and the radar direction finding module are arranged on a first platform and the steering module is arranged on a second platform and wherein the first platform comprises a transmitter arranged to send information from the first platform to the second platform.

10. Apparatus as claimed in claim 1 further comprising a user interface adapted to enable a user to provide user control signals and wherein the steering module is arranged to receive the user control signals and is adapted to determine an orientation alteration based at least in part on the user control signals.

11. Apparatus as claimed in claim 10 wherein the user control signals include at least one of decrease radar cross section, increase radar cross section, and adjust orientation without regard to radar cross section.

12. Apparatus as claimed in claim 1 wherein the steering module is adapted to determine an orientation alteration by determining an alteration in at least one of yaw, pitch, and roll.

13. Apparatus comprising:
   a radar detector mounted on a platform and adapted to detect at least two pulses of an incoming radar beam and to generate a radar detection signal indicative of the detection and of characteristics of the detected pulses;

a radar direction finding module mounted on the platform and arranged to receive the radar detection signal and adapted to generate a direction output signal indicative of a direction of an origin of the incoming radar beam;

a radar estimator mounted on the platform and arranged to receive the radar detection signal and adapted to generate an estimator output signal indicative of the characteristics of the detected pulses; and a steering module mounted on the platform and arranged to receive the direction output signal and the estimator output signal and adapted to determine an orientation alteration for the platform based at least in part on the direction of the origin of the incoming radar beam as indicated by the direction output and the estimator output signal to control a radar cross section of the platform presented to the incoming radar beam.

14. Apparatus as claimed in claim 13 wherein the characteristics of the detected pulses include pulse signal strength, timing of the pulses, and gaps in receiving the pulses.

15. Apparatus as claimed in claim 13 wherein the steering module comprises a memory adapted to store information of the radar cross section versus azimuth for the platform.

16. Apparatus as claimed in claim 13 wherein the steering module comprises a memory adapted to store information on constraints in altering an orientation or course of the platform and wherein the steering module determines an orientation alteration of the platform based at least in part on the constraints.

17. Apparatus as claimed in claim 16 wherein the constraints include at least one of travel time for the platform between two way-points, arrival time for the platform at a point, and fuel remaining at a way-point.

18. Apparatus comprising:

a radar detector adapted to detect at least two pulses of an incoming radar beam and to generate a radar detection signal indicative of the detection and of characteristics of the detected pulses, wherein the characteristics of the detected pulses include pulse signal strength, timing of the pulses, and gaps in receiving the pulses;

a radar direction finding module arranged to receive the radar detection signal and adapted to generate a direction output signal indicative of a direction of an origin of the incoming radar beam;

a radar estimator arranged to receive the radar detection signal and adapted to generate an estimator output signal indicative of the characteristics of the detected pulses;

a memory adapted to store information of the radar cross section versus azimuth for a platform carrying the steering module and information on constraints in altering an orientation or course of the platform; and a steering module arranged to receive the direction output signal and the estimator output signal and having access to the memory and adapted to determine an orientation alteration based at least in part on the direction of the origin of the incoming radar beam as indicated by the direction output, the estimator output signal, the information of the radar cross section versus azimuth for the platform, and information on constraints in altering an orientation or course of the platform to control a radar cross section presented by the platform to the incoming radar beam.

* * * * *